(12) United States Patent
Park (10) Patent No.: US 11,312,344 B2
(45) Date of Patent: Apr. 26, 2022

(54) PARKING BRAKING FORCE-ASSOCIATED REMOTE START-UP METHOD AND REMOTE START-UP SYSTEM OF MANUAL TRANSMISSION VEHICLE

(71) Applicants: Hyundai Motor Company, Seoul (KR); Kia Motors Corporation, Seoul (KR)

(72) Inventor: Deok-Ho Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 248 days.

(21) Appl. No.: 16/687,237

(22) Filed: Nov. 18, 2019

(65) Prior Publication Data

US 2020/0361431 A1 Nov. 19, 2020

(30) Foreign Application Priority Data

May 15, 2019 (KR) ........................ 10-2019-0057076

(51) Int. Cl.
| | |
|---|---|
| *B60T 7/12* | (2006.01) |
| *B60T 8/172* | (2006.01) |
| *F02N 11/08* | (2006.01) |
| *B60T 17/22* | (2006.01) |
| *B60T 7/16* | (2006.01) |
| *B60T 8/1755* | (2006.01) |
| *B60T 8/24* | (2006.01) |
| *B60T 8/26* | (2006.01) |
| *F02N 11/10* | (2006.01) |
| *H04W 4/48* | (2018.01) |

(52) U.S. Cl.
CPC ................ *B60T 8/172* (2013.01); *B60T 7/12* (2013.01); *B60T 8/17551* (2013.01); *H04W 4/48* (2018.02)

(58) Field of Classification Search
CPC .... B60T 8/17551; B60T 13/662; B60T 7/122; B60T 2201/06; B60T 2201/10; B60T 7/16; B60T 8/245; B60T 8/26; B60T 17/221; H04W 4/48; H04W 4/80; H04L 67/125; H04L 67/12; F02N 11/0807; F02N 11/103; B60Y 2400/81
See application file for complete search history.

(56) References Cited

U.S. PATENT DOCUMENTS

| | | | | |
|---|---|---|---|---|
| 6,009,984 | A * | 1/2000 | Zechmann | B60T 7/122 188/353 |
| 2003/0087727 | A1* | 5/2003 | Loibl | B60T 13/662 477/183 |
| 2005/0029865 | A1* | 2/2005 | Kobayashi | B60T 13/686 303/191 |

(Continued)

FOREIGN PATENT DOCUMENTS

KR 19970045323 A 7/1997

*Primary Examiner* — Mussa A Shaawat
(74) *Attorney, Agent, or Firm* — Mintz Levin Cohn Ferris Glovsky and Popeo, P.C.; Peter F. Corless (57) ABSTRACT

A remote start-up method of a manual transmission vehicle is provided. The method includes a parking braking force-associated remote start-up control that remotely starts-up an inclined parking vehicle parked on a ramp by confirming a situation where the parking braking force is maintained by a braking hydraulic pressure control of an electronic stability control (ESC) system in a remote start-up controller.

17 Claims, 4 Drawing Sheets

(56) References Cited

U.S. PATENT DOCUMENTS

| | | | |
|---|---|---|---|
| 2013/0103277 A1* | 4/2013 | Attallah | B60T 8/172 |
| | | | 701/70 |
| 2013/0282249 A1* | 10/2013 | Heise | B60T 13/746 |
| | | | 701/70 |
| 2014/0236461 A1* | 8/2014 | Edgren | B60R 25/246 |
| | | | 701/113 |
| 2015/0274139 A1* | 10/2015 | Okada | B60T 7/10 |
| | | | 701/70 |
| 2016/0272170 A1* | 9/2016 | Moore | B60T 13/588 |
| 2017/0267288 A1* | 9/2017 | Maguire | B62D 15/0285 |
| 2018/0111596 A1* | 4/2018 | Kim | B60T 7/16 |
| 2018/0170331 A1* | 6/2018 | Barber | B60T 8/26 |
| 2018/0347532 A1* | 12/2018 | Tam | G07C 5/0841 |
| 2020/0055493 A1* | 2/2020 | Baehrle-Miller | B60T 7/122 |
| 2020/0070788 A1* | 3/2020 | Michels | B60T 13/74 |
| 2020/0130622 A1* | 4/2020 | Lerner | G01C 21/3697 |

\* cited by examiner

W=GVW (GROSS VEHICLE WEIGHT_1,450kg)
θ=tan⁻¹ (GRADIENT, 20%INCLINATION)
$R_{Disc}$: BRAKE DISC EFFECTIVE RADIUS (0.1m)
$R_{Tire}$: TIRE STATIC LOAD RADIUS (0.3m)

PARKING BRAKING FORCE-ASSOCIATED REMOTE START-UP METHOD AND REMOTE START-UP SYSTEM OF MANUAL TRANSMISSION VEHICLE

CROSS-REFERENCE TO RELATED APPLICATION

This application claims priority to Korean Patent Application No. 10-2019-0057076, filed on May 15, 2019, which is incorporated herein by reference in its entirety.

BACKGROUND

Field of the Disclosure

The present disclosure relates to a remote start-up of a manual transmission vehicle, and more particularly, to a remote start-up system, which uses a parking braking force for remote start-up, thereby stably performing the remote start-up of a manual transmission vehicle parked on a ramp.

Description of Related Art

Generally, the remote start-up of the vehicle is implemented by a method for determining whether a remote start-up for an engine is performed after determining a brake and a shift stage in interlocking with the telematics. Therefore, the remote start-up is a technique for performing the engine start-up without a direct operation of a driver in a manual transmission vehicle or an automatic transmission vehicle, thereby improving the merchantability of the vehicle. Furthermore, the remote start-up also provides the convenience of adjusting the temperature within a vehicle in association with the air conditioning function of the vehicle.

The contents described in this section are to help the understanding of the background of the present disclosure, and may include what is not previously known to those skilled in the art to which the present disclosure pertains.

SUMMARY

However, a manual transmission vehicle has priority in eliminating vehicle problems in applying the remote start-up, which makes it difficult to respond to the increasing consumer needs. For example, a problem of a vehicle is safety, and when a vehicle is parked on a ramp, an automatic transmission vehicle does not cause a safety problem due to a parking-stage remote start-up condition, while a manual transmission vehicle may cause a safety problem by an unexpected situation such as vehicle departure in a brake and a neutral (N)-stage remote start-up condition.

Another problem is economical concerns of the vehicle, and this is because the remote start-up of the manual transmission vehicle may be performed in the ramp parking in association with an electronic parking brake (EPB), while the cost is increased together with increases in the number of parts and weight causing the difficulty in practical application due to the EPB. In particular, the EPB is a parking system for generating and maintaining a parking braking force by motor power by a button operation.

Therefore, an object of the present disclosure considering the above is to provide a remote start-up method and a remote start-up system of a parking braking force-associated manual transmission vehicle, which may convert a braking hydraulic pressure of an electronic stability control (ESC) for stopping and parking the vehicle into a parking braking force, thereby securing stability of the remote start-up in the ramp parking state, and particularly, performing the unrestricted remote start-up even in non-EPB application vehicle without causing the economic deterioration due to the EPB application in association with the ESC.

A remote start-up method of a manual transmission vehicle of the present disclosure for achieving the object may include a parking braking force-associated remote start-up control that remotely starts-up an inclined parking vehicle parked on a ramp by confirming a situation where the parking braking force is maintained by a braking hydraulic pressure control of an electronic stability control (ESC) system in a remote start-up controller. As an exemplary embodiment, the parking braking force-associated remote start-up control may be performed by a remote start-up preparing control for a remote start-up signal, a remote start-up determining control for a remote start-up system applied to the inclined parking vehicle, and a remote start-up executing control for the inclined parking vehicle.

Additionally, the remote start-up preparing control may be performed by detecting the remote start-up signal, confirming the vehicle inclined parking of the inclined parking vehicle, and calculating an inclined parking braking force at which the inclined parking vehicle may maintain the parking state on the ramp in the ESC system, by the remote start-up controller. As an exemplary embodiment of the remote start-up preparing control, the detecting the remote start-up signal is a remote start-up signal of a mobile device via a wireless network, the confirming the vehicle inclined parking may be performed by a signal detection value of an inclination sensor, the inclined parking braking force is a sum of the parking braking forces for a front wheel and a rear wheel of the inclined parking vehicle, and the inclined parking braking force may be calculated by applying a safety factor.

Further, the remote start-up determining control may be performed by confirming the state of the remote start-up system of the inclined parking vehicle, generating a braking hydraulic pressure based on the inclined parking braking force in the ESC system, and confirming a normal operation of the remote start-up system. The confirming of the state of the remote start-up system may include a hydraulic brake system of the manual transmission vehicle together with the ESC system as a remote start-up system, and may be performed by any one of whether the ESC system is faulty or erroneous and whether a brake fluid warning lighting signal of the hydraulic brake system is generated.

As an exemplary embodiment, when the confirming the state of the remote start-up system is improper, a system warning signal may be transmitted to a remote start-up cluster of the manual transmission vehicle and the mobile device, and the generating of the braking hydraulic pressure may apply the inclined parking braking force to each of a front wheel and a rear wheel of the manual transmission vehicle. Additionally, the confirming of the normal operation of the remote start-up system may include a front wheel brake and a rear wheel brake cooperating in a hydraulic brake system of the manual transmission vehicle as a remote start-up system, and may be performed by any one of whether the hydraulic pressure of the hydraulic brake system is reduced and whether the hydraulic pressure for each of the front wheel brake and the rear wheel brake is maintained. The hydraulic pressure reduction may be confirmed by brake fluid leakage for a predetermined time after applying the inclined parking braking force.

When confirming the normal operation of the remote start-up system is improper, a system abnormal diagnostic signal may be transmitted to a remote start-up cluster of the manual transmission vehicle and the mobile device. The remote start-up executing control may be performed by performing the remote start-up of the inclined parking vehicle, detecting a system operation signal of the inclined parking vehicle, and entering a system post remote start-up that releases the inclined parking braking force by the ESC system by maintaing the remote start-up of the inclined parking vehicle.

As an exemplary embodiment of the remote start-up executing control, the performing of the remote start-up may include transmitting a remote start-up completion signal to the mobile device. The detecting of the system operation signal may be performed by a brake pedal operation or an accelerator pedal operation of the inclined parking vehicle, and may be continuously performed by setting a predetermined time as an operation standby time.

Then, a remote start-up system of a manual transmission vehicle of the present disclosure for achieving the object may include a remote start-up controller configured to execute a remote start-up preparing control that confirms an inclined parking braking force calculated for a front wheel and a rear wheel in an electronic stability control (ESC) system upon confirming a remote start-up signal, a remote start-up determining control that confirms an abnormal operation state and a normal operation state by including a hydraulic brake system controlled cooperatively with the ESC system as a remote start-up system, and a remote start-up executing control that releases the inclined parking braking force in the ESC system after the remote start-up; a mobile device configured to transmit the remote start-up signal to the remote start-up controller; and a remote start-up cluster provided in the manual transmission vehicle to display the state of the remote start-up.

As an exemplary embodiment, the remote start-up controller and the mobile device may be configured to communicate with each other via a wireless network. The mobile device may be a smart phone or a PDA terminal. The remote start-up control using the remote start-up system of the manual transmission vehicle of the present disclosure implements the following operations and effects in association with the parking braking force.

Firstly, the manual transmission vehicle may stably implement the remote start-up in the ramp parking state. Secondly, it may be possible to convert the braking hydraulic pressure (e.g., brake fluid pressure) of the ESC into the parking braking force for the stable ramp remote start-up, thereby solving all restrictions of the manual transmission vehicle for mounting the remote start-up function. Thirdly, it may be possible to apply the ESC, thereby not causing the economic deterioration such as an increase in the number of parts/an increase in vehicle weight/an increase in cost due to the EPB application. Fourthly, it may be possible to perform the stable ramp remote start-up even in the non-EPB application manual transmission vehicle, thereby applying to all manual transmission vehicles. Fifthly, it may be possible to fulfill the consumer needs for the manual transmission vehicle with the stable ramp remote start-up.

BRIEF DESCRIPTION OF THE DRAWINGS

A brief description of each drawing is provided to more sufficiently understand drawings used in the detailed description of the present invention.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying exemplary drawings, and since these exemplary embodiments are one example and may be implemented in various different forms by those skilled in the art to which the present disclosure pertains, they are not limited to the embodiments described herein.

Figure 1:
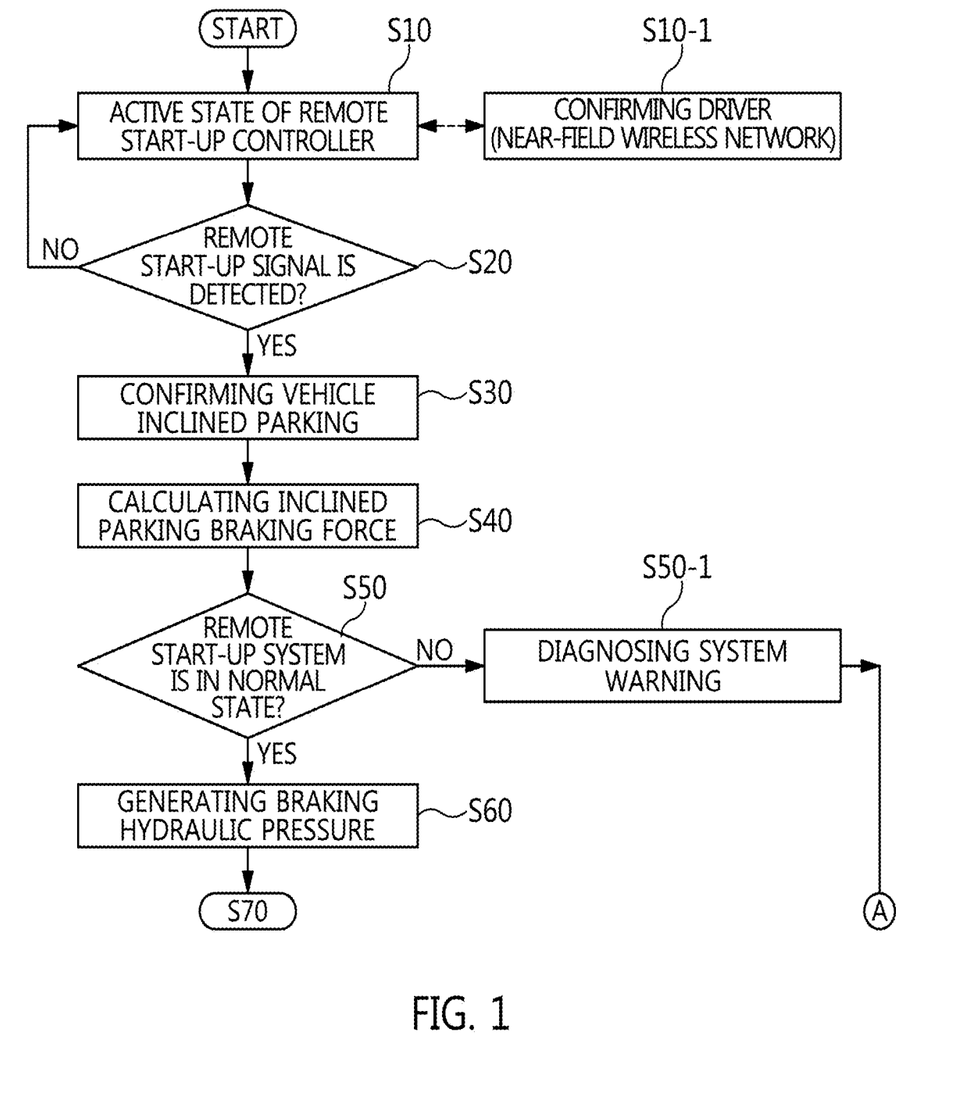
FIG. 1 and FIG. 2 are a flowchart of a remote start-up method of a parking braking force-associated manual transmission vehicle according to an exemplary embodiment of the present disclosure.
Figure 2:
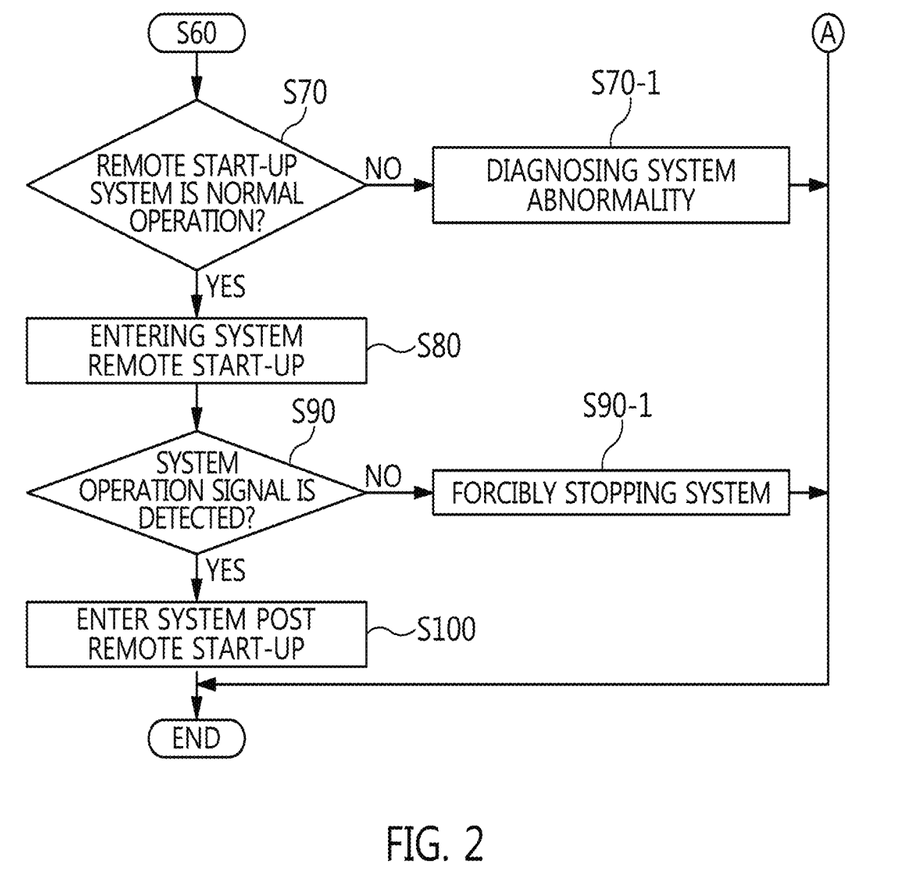

Referring to FIG. 1 and FIG. 2, a remote start-up method of a manual transmission vehicle may be performed by a remote start-up preparing control for a remote start-up signal S10 to S40, then a remote start-up determining control for a remote start-up system S50 to S70 followed by a remote start-up executing control for a vehicle S80 to S100. Therefore, the remote start-up preparing control S10 to S40, the remote start-up determining control S50 to S70, and the remote start-up executing control S80 to S100 are characterized by a parking braking force-associated remote start-up control that confirms a situation where the parking braking force is maintained by a braking hydraulic control of an electronic stability control (ESC) and then remotely starts-up the manual transmission vehicle parked on the ramp (e.g., inclined road).

Particularly, the remote start-up preparing control S10 to S40 and the remote start-up determining control S50 to S70 may limit the remote start-up request of a driver to a state of generating an inclined parking braking force for continuous possibility of the vehicle parking state in the vehicle parking (flat or ramp) state, and the remote start-up executing control S80 to S100 applies an operation waiting time (e.g., about 10 minutes) even if the remote start-up is safely performed in the vehicle parking state, thereby preventing occurrence of damage of the ESC hardware internal coil that may occur in the braking hydraulic pressure control situation of the ESC when the actual vehicle operation is not performed.

Therefore, the remote start-up method of the manual transmission vehicle may apply the remote start-up without any safety issues even in the ramp parking state of the manual transmission vehicle, and particularly, apply the ESC that may perform the braking hydraulic pressure control instead of applying the electronic parking brake (EPB), thereby having the EPB-independent remote start-up system and minimizing the burden on parts and material cost/weight for the remote start-up. Therefore, the remote start-up method of the manual transmission vehicle may be characterized as the parking braking force-associated remoter start-up method of manual transmission vehicle.

Figure 3:
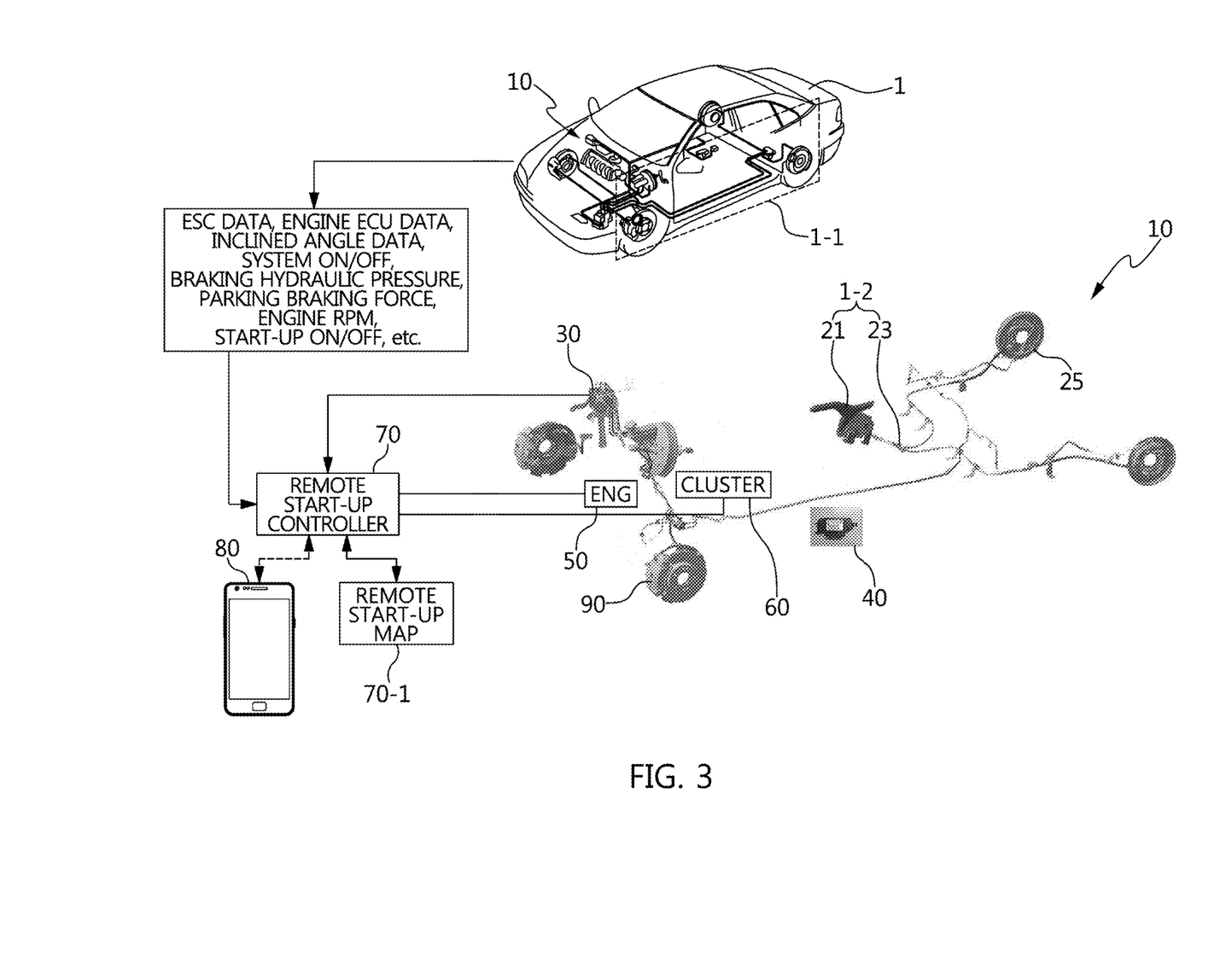
FIG. 3 is a diagram illustrating an example of a manual transmission vehicle to which a remote start-up system that implements a parking braking force-associated remote start-up control according to an exemplary embodiment of the present disclosure is applied.

Meanwhile, referring to FIG. 3, a manual transmission vehicle 1 exemplifies a hydraulic brake system 1-1 for generating a brake fluid pressure at a brake pedal operation, a mechanical parking braking system 1-2 for generating a parking braking force at a parking lever operation, and a remote start-up system 10 for performing a remote start-up including a ramp parking state with the hydraulic brake system 1-1 as a component.

Specifically, the hydraulic brake system 1-1 may be classified into a front wheel brake 90 and a rear wheel brake 25 operated by the brake fluid pressure generated by a booster and a master cylinder connected with the brake pedal, and the front wheel brake 90 applies a caliper brake using a caliper while the rear wheel brake 25 applies a drum brake using a drum. However, the rear wheel brake 25 may also include the caliper brake. The mechanical parking braking system 1-2 may include a parking lever 21 operated by a driver and a parking cable 23 that transfers a lever operating force to the rear wheel brake 25 side. Therefore, the mechanical parking braking system 1-2 is a typical component for generating a non-feedback parking braking force.

Additionally, the remote start-up system 10 may include an electronic stability control (ESC) system 30, an inclination sensor 40, an engine electronic control unit (ECU) 50, a remote start-up cluster 60, a remote start-up controller 70, and a mobile device 80, and may include the front wheel brake 90 and the rear wheel brake 25 of the hydraulic brake system 1-1 as a cooperative system. For example, the ESC system 30 may be configured to maintain the rear wheel in the braking state with the rear wheel brake 25 while maintaining the front wheel in the braking state with the front wheel brake 90, thereby providing and adjusting the brake fluid pressure for stopping and parking the manual transmission vehicle 1 parked on the ramp instead of the parking braking force of the mechanical parking braking system 1-2. Accordingly, the ESC system 30 may include an ESC ECU, an ESC modulator, and a motor pump. Particularly, the ESC modulator is a hydraulic electronic control unit (HECU), and may be configured to monitor and feedback the braking pressure and the inclined parking braking force $F_{Brake}$ ($F_{Front}+F_{Rear}$) with a pressure sensor built-in therein.

As described above, the ESC system 30 may be configured to generate the brake fluid pressure of the front wheel inclined parking braking force $F_{Front}$ required by the front wheel brake 90 of the hydraulic brake system 1-1 and the brake fluid pressure of the rear wheel inclined parking braking force $F_{Rear}$ required by the rear wheel brake 25 when the manual transmission vehicle 1 is parked on the ramp, respectively. As a result, the ESC system 30 may use the inclined parking braking force $F_{Brake}$ ($F_{Front}+F_{Rear}$) of the front wheel/rear wheel brakes 90, 25 that may maintain the ramp parking state of the manual transmission vehicle 1 and feedback whether the parking state of the vehicle may be maintained, and the inclined parking braking force $F_{Brake}$ ($F_{Front}+F_{Rear}$) may supplement and replace all of the conventional incomplete situations where the parking braking force by the hydraulic brake system 1-1 may not be sufficiently generated at the parking braking together with a first-stage gear on the ramp and the feedback impossible situation of the mechanical parking braking system 1-2 that generates the parking braking force for the rear wheel brake 25 by the parking lever 21 and the parking cable 23, thereby stably performing the remote parking even in the manual transmission vehicle 1.

For example, the inclination sensor 40 may be configured to detect the inclination of the road on which the manual transmission vehicle 1 is location and generate a signal. The engine ECU 50 may be configured to receive a signal from the ESC indicating whether the parking braking force may be maintained to determine and enforce whether the remote start-up is possible. Particularly, the engine ECU 50 may replace the function of the remote start-up controller 70. For example, the remote start-up cluster 60 is provided on the driver seat of the manual transmission vehicle 1, and may be configured to display a faulty state for the hydraulic brake system 1-1 and the ESC system 30 that is a component of the remote start-up system 10 and may be configured to transfer a signal therefor.

For example, the remote start-up controller 70 may be configured to detect and confirm ESC data, engine ECU data, inclined angle data, system ON/OFF, braking hydraulic pressure, parking braking force, engine RPM, start-up ON/OFF, etc. as input data, and execute an operation to be associated with a remote start-up map 70-1 to detect and recognize the component of the remote start-up system 10 to be associated with the ESC system 30. Particularly, the remote start-up controller 70 may be specialized to exclusively use the function of maintaining the parking braking force of the engine ECU 50 with the function of receiving a signal from the ESC system 30 to determine and enforce whether the remote start-up is possible.

For example, the remote start-up map 70-1 has a mapping map that matches with the inclined parking braking force $F_{Brake}$ ($F_{Front}+F_{Rear}$) calculated by the ESC system 30 to provide a control value suitable for the magnitude of the inclined parking braking force to the remote start-up controller 70. The mobile device 80 may be a smart phone or a Personal Digital Assistant (PDA) terminal, and mutually communicates with the remote start-up controller 70 via a wireless network. In particular, the wireless network may be a near-field wireless network such as Bluetooth.

Hereinafter, the parking braking force-associated remote start-up method of the manual transmission vehicle of FIG. 1 and FIG. 2 will be described in detail with reference to FIGS. 3 to 5. In particular, the control subject may be the remote start-up controller 70 configured to exchange the information of the inclined parking braking force $F_{Brake}$ ($F_{Front}+F_{Rear}$) with the ESC system 30, exchange the information of the engine operating state with the engine ECU 50, and associated with the mobile device 80. The control object may be a component of the remote start-up system 10 including the engine and the ESC system 30.

Firstly, the remote start-up controller 70 may be configured to execute the remote start-up preparing control S10 to S40 including activating the remote start-up controller S10, detecting the remote start-up signal S20, confirming the vehicle inclined parking S30, and calculating the inclined parking braking force S40. Therefore, the controller 70 may be configured to determine whether the vehicle parking state may be maintained with respect to the remote start-up request of a driver in the vehicle parking (flat or ramp) state before the remote start-up.

Referring to FIG. 3, the remote start-up controller 70 may use ESC data, engine ECU data, inclined angle data, system ON/OFF, braking hydraulic pressure (i.e., brake fluid pressure), parking braking force, engine RPM, start-up ON/OFF, etc. as input data to check the state of each system of the manual transmission vehicle 1. The activating of the remote start-up controller S10 indicates that power is supplied in the parking state of the manual transmission vehicle 1. Therefore, the driver may confirm the active state of the remote start-up controller 70 with a mobile device 80 via the wireless network as in confirming of the driver S10-1, and the remote start-up controller 70 may be configured to receive the remote start-up signal transmitted via the mobile device 80.

The detecting of the remote start-up signal S20 may be performed by the remote start-up signal of the driver received by the remote start-up controller 70 in the confirming of the driver S10-1. The confirming of the vehicle inclined parking S30 may be performed by the remote start-up controller 70 by receiving the inclination signal detected by the inclination sensor 40.

The calculating of the inclined parking braking force S40 may include reading and confirming the inclined parking braking force $F_{Brake}$ ($F_{Front}+F_{Rear}$), which has been calculated by the ESC system 30 according to the inclination, from the ESC system 30 with the remote start-up controller 70. Therefore, the ESC system 30 may be configured to calculate the inclined parking braking force by the remote start-up signal of the remote start-up controller 70, and the remote start-up controller 70 may be configured to detect and confirm the inclined parking braking force calculated by the ESC system 30.

Figure 4:
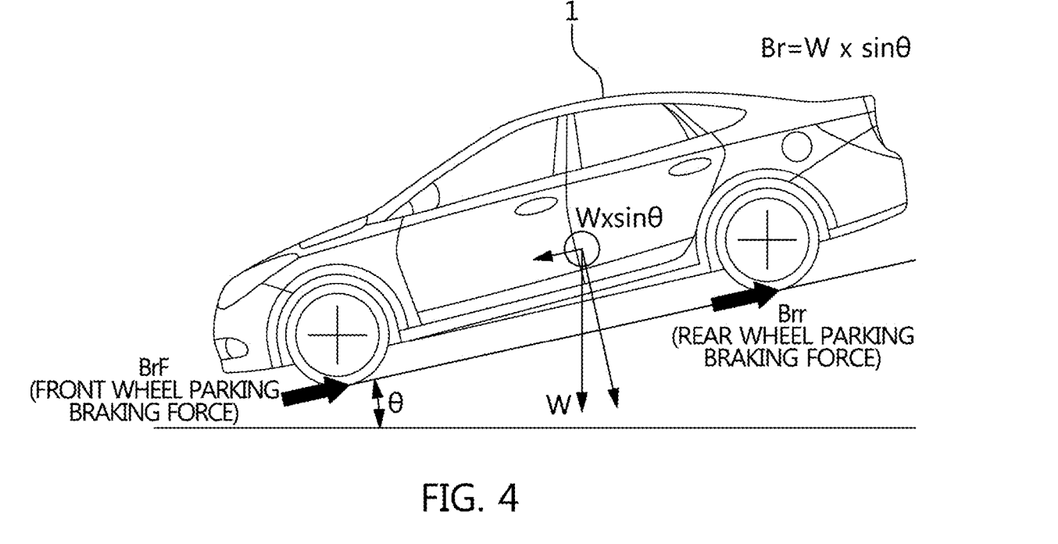
FIG. 4 is a diagram illustrating the dynamic relationship of the manual transmission vehicle parked on the ramp for calculating a parking braking force according to an exemplary embodiment of the present disclosure.
Figure 5:
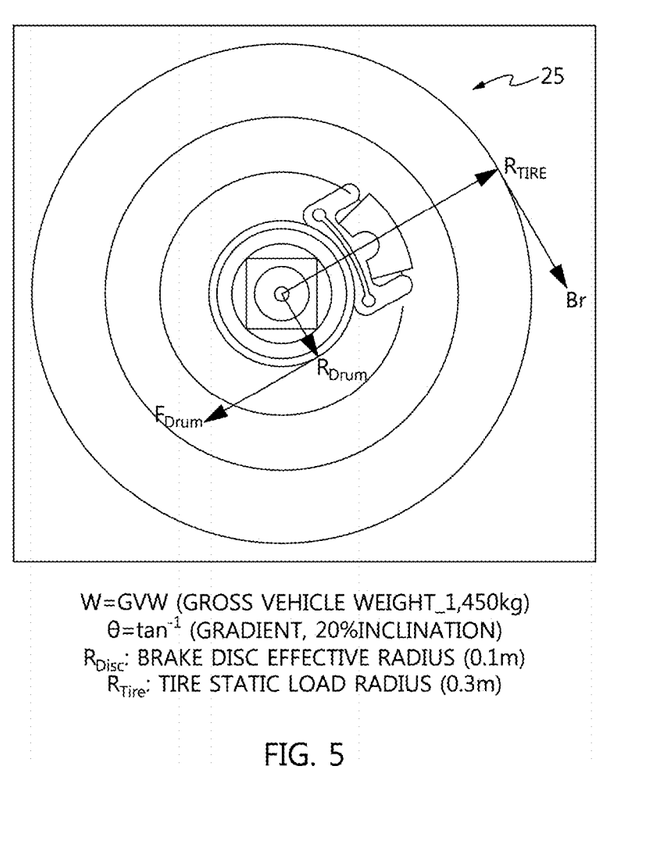
FIG. 5 is a diagram illustrating the dynamic relationship of a drum brake constituting a parking brake of the manual transmission vehicle parked on the ramp for calculating the parking braking force according to an exemplary embodiment of the present disclosure.

The calculation of the inclined parking braking force $F_{Brake}$ ($F_{Front}+F_{Rear}$) is exemplified in FIGS. 4 and 5. In particular, the inclined parking braking force $F_{Brake}$ may be summed by setting the $F_{Front}$ as the front wheel parking braking force $B_{rf}$ generated by the front wheel brake 90 and the $F_{Rear}$ as the rear wheel parking braking force $B_{rr}$ generated by the rear wheel brake 25.

Referring to FIGS. 4 and 5, a calculation principle for maintaining the front wheel parking braking force $B_{rf}$ of the front wheel brake 90 and the rear wheel parking braking force $B_{rr}$ of the rear wheel brake 25 at the ramp parking with the inclined parking braking force $F_{Brake}$ is exemplified. For this purpose, an ESC Electronic Control Unit (ECU) of the ESC system 30 applied to the manual transmission vehicle 1 includes the operation logic (or program) for generating the necessary parking braking force for each inclination. Then, W, Θ, $R_{Disc}$, and $R_{Tire}$ may be applied as parameters to calculate the inclined parking braking force. In particular, "W" refers to a gross vehicle weight (GVW), "Θ" refers to the gradient $\tan^{-1}$ of the road or the vehicle, "$R_{Disc}$" refers to a brake disc effective radius, and "$R_{Tire}$" refers to a tire static load radius.

For example, the relationship between a parking braking torque and a necessary static braking torque generated in the manual transmission vehicle 1 is defined as follows.

Braking torque relationship equation: $F_{Brake} \times R_{Disc} \geq B_r (B_{rf}+B_{rr}) \times R_{Tire}$     Equation 1

This is the relationship of the generated braking torque≥ the necessary static braking torque (theoretical value), and indicates that the vehicle may maintain the parking state only when the generated braking torque $F_{Brake} \times R_{Disc}$ of the front/rear wheel brakes is greater than the necessary static braking torque $B_r (B_{rf}+B_{rr}) \times R_{Tire}$ acting on the tire.

Static braking force relationship equation: $B_r$ (necessary parking braking force)=$W \times \sin \Theta$     Equation 2

This indicates the static braking force for the manual transmission vehicle 1 to maintain the parking state in the ramp of the gradient Θ. The inclined parking braking force may be calculated by applying an input condition for maintaining the parking state directly connected to the safety to the relationship equation. In particular, the input condition applies a vehicle weight of a gross vehicle weight, a tire of the maximum size (maximum outer diameter) state, a brake specification of a minimum size, a safety factor (e.g., 1.1) according to the inclination (e.g., an inclination value is received from the inclination sensor 40 (or ACU) in FIG. 4), and an inclination condition considering safety (e.g., about 5% or less in the inclination condition may be set as a 5% condition).

For example, the necessary parking braking force $B_r$ for maintaining the parking state of the manual transmission vehicle 1 with a gross vehicle weight W of 1,450 kg on the road with the inclination of 20% is as follows.

$B_r = 1450 \times \sin(\tan^{-1} 0.2) = 284.4 \text{kgf}$

The generated braking torque ($F_{Brake} \times R_{Disc}$) therefrom is as follows.

$$F_{Brake} \times R_{Disc} \geq 284.4 \text{kgf} * 0.3\text{m} = 85.32 \text{kgf·m}$$

Then, the inclined parking braking force $F_{Brake}$ ($F_{Front}$+ $F_{Rear}$), which is the sum of the front wheel inclined parking braking force $F_{Front}$ and the rear wheel inclined parking braking force $F_{Rear}$, should be calculated to be greater than 850.32 kgf (85.32/0.1) by applying $R_{Disc}$ of 0.1 m. Then, the inclined parking braking force $F_{Brake}$ ($F_{Front}$+$F_{Rear}$) applying the safety factor of 1.1 may be determined as 935.4 kgf, which is 110% of 850.32 kgf.

Therefore, the ESC system 30 (see FIG. 4) that performs the braking hydraulic pressure control may be configured to operate a motor in the ESC modulator based on the calculation of the ESC ECU to generate the braking force at 850.32 kgf to 935.4 kgf in the front/rear wheel brakes 90, 25, and generate the braking pressure by the motion of a pump operated by the motor to transmit the pressure to each wheel brake (e.g., caliper, etc.) to thus generate the parking braking force. Therefore, the inclined parking braking force may be tuned to reflect a change based on the vehicle specification (e.g., a vehicle weight, a tire static load radius, and the sizes of front/rear wheel brakes) and the road inclination.

Referring back to FIG. 1 and FIG. 2, the remote start-up controller 70 implements the remote start-up determining control S50 to S70 by confirming the state of the remote start-up system S50, generating the braking hydraulic pressure S60, and confirming the normal operation of the remote start-up system S70. Therefore, a safety problem due to the remote start-up of the vehicle parked on the ramp may be prevented.

Referring to FIG. 3, the remote start-up controller 70 may be configured to confirm the state of the remote start-up system S50 by detecting and confirming any one of whether the ESC system 30 is faulty or erroneous and whether a brake fluid warning lighting signal of the hydraulic brake system 1-1 is generated to determine whether the inclined parking braking force may be generated. Therefore, when it is impossible to generate the inclined parking braking force in confirming the state of the remote start-up system S50, it is switched to diagnosing a system warning S50-1 to confirm the remote start-up impossible state in the remote start-up cluster 60 and the mobile device 80. In particular, a remote start-up impossible signal may be generated in the remote start-up controller 70.

However, when the inclined parking braking force is generated in confirming the state of the remote start-up system S50, it enters the generating the braking hydraulic pressure S60 followed by confirming the normal operation of the remote start-up system S70. In particular, the generating of the braking hydraulic pressure S60 indicates that the front wheel parking braking force $B_{rf}$ acts on the front wheel brake 90 and the rear wheel parking braking force $B_{rr}$ acts on the rear wheel brake 25, respectively, in the inclined parking braking force $F_{Brake}$ of FIGS. 3 and 4. The confirming of the normal operation of the remote start-up system S70 may include determining whether the remote start-up is possible.

Referring to FIG. 3, the remote start-up controller 70 may be configured to confirm the normal operation of the remote start-up system S70 by detecting and confirming any one of whether the inclined parking braking force $F_{Brake}$ ($F_{Front}$+ $F_{Rear}$) of the ESC system 30 is confirmed, whether the hydraulic pressure of the hydraulic brake system 1-1 is reduced in the braking hydraulic pressure control of the ESC system 30, and whether the hydraulic pressure of each of the front wheel brake 90 and the rear wheel brake 25 is maintained. In particular, for example, the hydraulic pressure reduction due to brake fluid leakage may be set to a case where the necessary braking hydraulic pressure due to the inclined parking braking force is generated and then the hydraulic pressure is not maintained for about 10 seconds therefor.

Therefore, when the generated inclined parking braking force is unable to be continuously maintained in confirming the normal operation of the remote start-up system S70, it is switched to the diagnosing the abnormality of the system S70-1, thereby confirming the remote start-up impossible state in the remote start-up cluster 60 and the mobile device 80. In particular, the remote start-up impossible signal may be generated in the remote start-up controller 70. Finally, the remote start-up controller 70 may be configured to implement the remote start-up executing control S80 to S100 by entering a system remote start-up S80, detecting a system operation signal S90, and entering a system post remote start-up S100. Therefore, occurrence of damage of the ESC hardware internal coil may be prevented in the safe remote start-up situation in the vehicle parking state.

Referring to FIG. 3, the remote start-up controller 70 may be configured to enter the system remote start-up S80 by notifying the mobile device 80 that the remote start-up has been performed while performing the engine start-up of the manual transmission vehicle 1 in association with the engine ECU 50. The detecting of the system operation signal S90 may include detecting and confirming the vehicle operating attempt of the driver during an operation standby time by the remote start-up controller 70. In particular, the operation standby time may be set within about 10 minutes. In addition, the vehicle operating attempt may include applying a brake pedal operation or an accelerator pedal operation.

As a result, in detecting the system operation signal S90, the remote start-up controller 70 may be configured to switch to forcibly stop a system S90-1 when the brake pedal operation or the accelerator pedal operation is not detected and confirmed for about 10 minutes. The forcibly stopping of the system S90-1 may be a hydraulic pressure state release (ESC OFF) by the ESC system 30 after the engine is turned off (engine start-up OFF), and may be a remote start-up stop notification for the mobile device 80.

Additionally, in detecting the system operation signal S90, the remote start-up controller 70 may be configured to enter the system post remote start-up S100 when the brake pedal operation or the accelerator pedal operation is detected and confirmed within about 10 minutes. The entering of the system post remote start-up S100 indicates the end of the parking braking force-associated remote start-up control, which indicates that the manual transmission vehicle 1 has been switched to the operating state by the driver. Therefore, the ESC system 30 may be configured to switch to the braking hydraulic pressure control state for the hydraulic brake system 1-1.

As described above, the parking braking force-associated remote start-up method applied to the remote start-up system 10 of the manual transmission vehicle 1 according to the present exemplary embodiment may perform the remote start-up preparing control that calculates the inclined parking braking force for the front wheel and the rear wheel in the electronic stability control (ESC) system 30 upon confirming the remote start-up signal of the mobile device 80, the remote start-up determining control that confirms the abnormal operation state and the normal operation state by including the hydraulic brake system 1-1 cooperatively operated with the ESC system 30 as the remote start-up system, and the remote start-up executing control that releases the inclined parking braking force by the ESC system after remote start-up, by the remote start-up controller 70, thereby securing the stability of the remote start-up in the ramp parking state by the braking hydraulic pressure of the ESC, and particularly, performing the unrestricted remote start-up even in the non-EPB application vehicle without causing the economic deterioration due to the EPB application in association with the ESC.

What is claimed is:

1. A remote start-up method of a manual transmission vehicle, comprising:
    executing a parking braking force-associated remote start-up control that remotely starts-up an inclined parking vehicle parked on a ramp by confirming a situation where the parking braking force is maintained by a braking hydraulic pressure control of an electronic stability control (ESC) system in a remote start-up controller,
    wherein the parking braking force-associated remote start-up control is performed by a remote start-up preparing control for a remote start-up signal, a remote start-up determining control for a remote start-up system applied to the inclined parking vehicle, and a remote start-up executing control for the inclined parking vehicle,
    wherein the remote start-up preparing control includes detecting the remote start-up signal, confirming inclined parking of the inclined parking vehicle, and calculating an inclined parking braking force at which the inclined parking vehicle may maintain a parking state on the ramp in the ESC system, by the remote start-up controller, and
    wherein the inclined parking braking force is calculated by applying a safety factor.

2. The remote start-up method of the manual transmission vehicle of claim 1, wherein the detecting the remote start-up signal is a remote start-up signal of a mobile device via a wireless network.

3. The remote start-up method of the manual transmission vehicle of claim 1, wherein the confirming of the vehicle inclined parking is performed by a signal detection value of an inclination sensor.

4. The remote start-up method of the manual transmission vehicle of claim 1, wherein the inclined parking braking force is a sum of the parking braking forces for a front wheel and a rear wheel of the inclined parking vehicle.

5. The remote start-up method of the manual transmission vehicle of claim 1, wherein the remote start-up determining control includes confirming the state of the remote start-up system of the inclined parking vehicle, generating a braking hydraulic pressure according to the inclined parking braking force in the ESC system, and confirming a normal operation of the remote start-up system.

6. The remote start-up method of the manual transmission vehicle of claim 5, wherein the confirming of the state of the remote start-up system includes a hydraulic brake system of the manual transmission vehicle together with the ESC system as a remote start-up system, and is performed by any one of whether the ESC system is faulty or erroneous and whether a brake fluid warning lighting signal of the hydraulic brake system is generated.

7. The remote start-up method of the manual transmission vehicle of claim 6, wherein when the confirming of the state of the remote start-up system is improper, a system warning signal is transmitted to a remote start-up cluster of the manual transmission vehicle and the mobile device.

8. The remote start-up method of the manual transmission vehicle of claim 5, wherein the generating of the braking hydraulic pressure includes applying the inclined parking braking force to each of a front wheel and a rear wheel of the manual transmission vehicle.

9. The remote start-up method of the manual transmission vehicle of claim 5, wherein the confirming of the normal operation of the remote start-up system includes a front wheel brake and a rear wheel brake cooperating in a hydraulic brake system of the manual transmission vehicle as a remote start-up system, and is performed by any one of whether the hydraulic pressure of the hydraulic brake system is reduced and whether the hydraulic pressure for each of the front wheel brake and the rear wheel brake is maintained.

10. The remote start-up method of the manual transmission vehicle of claim 9, wherein the hydraulic pressure reduction is confirmed by brake fluid leakage for a predetermined time after applying the inclined parking braking force.

11. The remote start-up method of the manual transmission vehicle of claim 9, wherein when the confirming of the normal operation of the remote start-up system is improper, a system abnormal diagnostic signal is transmitted to a remote start-up cluster of the manual transmission vehicle and the mobile device.

12. The remote start-up method of the manual transmission vehicle of claim 1, wherein the remote start-up executing control includes performing the remote start-up of the inclined parking vehicle, detecting a system operation signal of the inclined parking vehicle, and entering a system post remote start-up that releases the inclined parking braking force by the ESC system by maintaining the remote start-up of the inclined parking vehicle.

13. The remote start-up method of the manual transmission vehicle of claim 12, wherein the performing the remote start-up includes transmitting a remote start-up completion signal to the mobile device.

14. The remote start-up method of the manual transmission vehicle of claim 12, wherein the detecting of the system operation signal is performed by a brake pedal operation or an accelerator pedal operation of the inclined parking vehicle, and continuously performed by setting a predetermined time as an operation standby time.

15. A remote start-up system of a manual transmission vehicle, comprising:
    a remote start-up controller configured to perform a remote start-up preparing control that confirms an inclined parking braking force calculated for a front wheel and a rear wheel in an electronic stability control (ESC) system upon confirming a remote start-up signal, a remote start-up determining control that confirms an abnormal operation state and a normal operation state by including a hydraulic brake system operated cooperatively with the ESC system as a remote start-up system, and a remote start-up executing control that releases the inclined parking braking force in the ESC system after the remote start-up;
    a mobile device configured to transmit the remote start-up signal to the remote start-up controller; and
    a remote start-up cluster disposed in the manual transmission vehicle to display the state of the remote start-up,
    wherein the remote start-up controller is configured to execute a parking braking force-associated remote start-up control that remotely starts-up an inclined parking vehicle parked on a ramp by confirming that the inclined parking braking force is maintained by a braking hydraulic pressure control of the ESC system, wherein the remote start-up preparing control is configured to detect the remote start-up signal, confirm inclined parking of the inclined parking vehicle, calculate the inclined parking braking force at which the inclined parking vehicle may maintain a parking state on the ramp in the ESC system by the remote start-up controller, and wherein the inclined parking braking force is calculated by applying a safety factor.

16. The remote start-up system of claim 15, wherein the remote start-up controller and the mobile device communicate with each other via a wireless network.

17. The remote start-up system of claim 16, wherein the mobile device is a smart phone or a personal digital assistant (PDA) terminal.

\* \* \* \* \*